United States Patent
Dubberstein

(10) Patent No.: US 7,118,532 B2
(45) Date of Patent: Oct. 10, 2006

(54) DATA DEPENDENT COLOR WALL FILTERS

(75) Inventor: David Dubberstein, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 168 days.

(21) Appl. No.: 10/840,542

(22) Filed: May 6, 2004

(65) Prior Publication Data

US 2005/0251034 A1    Nov. 10, 2005

(51) Int. Cl.
*A61B 8/06* (2006.01)
*H04B 1/10* (2006.01)

(52) U.S. Cl. ...................................... 600/455; 327/559

(58) Field of Classification Search ........ 600/453–457; 73/861.25; 375/233, 350; 327/552–559
See application file for complete search history.

(56) References Cited

U.S. PATENT DOCUMENTS

| | | | | |
|---|---|---|---|---|
| 3,868,605 A | * | 2/1975 | Poole | 333/176 |
| 4,210,872 A | * | 7/1980 | Gregorian | 330/9 |
| 4,679,001 A | * | 7/1987 | West | 327/556 |
| 5,349,524 A | | 9/1994 | Daft et al. | 600/441 |
| 5,432,723 A | * | 7/1995 | Chen et al. | 708/300 |
| 5,524,629 A | | 6/1996 | Mahony | 600/454 |
| 5,676,148 A | * | 10/1997 | Koo et al. | 600/447 |
| 5,706,817 A | * | 1/1998 | Song et al. | 600/453 |
| 5,823,964 A | * | 10/1998 | Liu et al. | 600/454 |
| 6,126,604 A | * | 10/2000 | Bae | 600/454 |
| 6,296,612 B1 | * | 10/2001 | Mo et al. | 600/455 |
| 6,556,871 B1 | * | 4/2003 | Schmitt et al. | 607/60 |
| 6,733,455 B1 | * | 5/2004 | Mo et al. | 600/454 |

OTHER PUBLICATIONS

Qiuting, H. et al, "Design Techniques for Switched-Capacitor Broad-Band Phase-Splitting Networks",□□IEEE Trans. on Circuits and Systems, vol. CAS-34, No. 9, Sep. 1987, pp. 1096-1102.*
Fuller, M. et al , A Portable, Low cost, Highly Integrated 3D Mechanical Ultrasound System, 2003 IEEE Ultrasonics Symposium, pp. 38-41.*

* cited by examiner

*Primary Examiner*—Francis J Jaworski
(74) *Attorney, Agent, or Firm*—McAndrews, Held & Malloy, Ltd.; Peter J. Vogel; Michael A. Dellapenna

(57) ABSTRACT

The present invention generally relates to ultrasound. In particular, the present invention relates to data dependent color wall filters (used in ultrasound imaging devices for example). Certain embodiments of the present invention relate to a color wall filter that provides flash reduction and clutter suppression. One embodiment of the color wall filter comprises an impulse response filter stage (either a finite or infinite impulse response filter) and a bi-quad filter stage that is data dependent. It is contemplated that the bi-quad filter stage may comprise a series of bi-quad filters, wherein the impulse response filter stage is cascaded into at least one bi-quad filter of the series of bi-quad filters.

5 Claims, 7 Drawing Sheets

I AND Q DATA INPUT INTO THE WALL FILTER

I AND Q DATA OUTPUT OF THE FIRST STAGE OF THE WALL FILTER WITH NO ZERO MOVEMENT

I AND Q DATA OUTPUT OF THE FIRST STAGE OF THE WALL FILTER WITH ZERO MOVEMENT

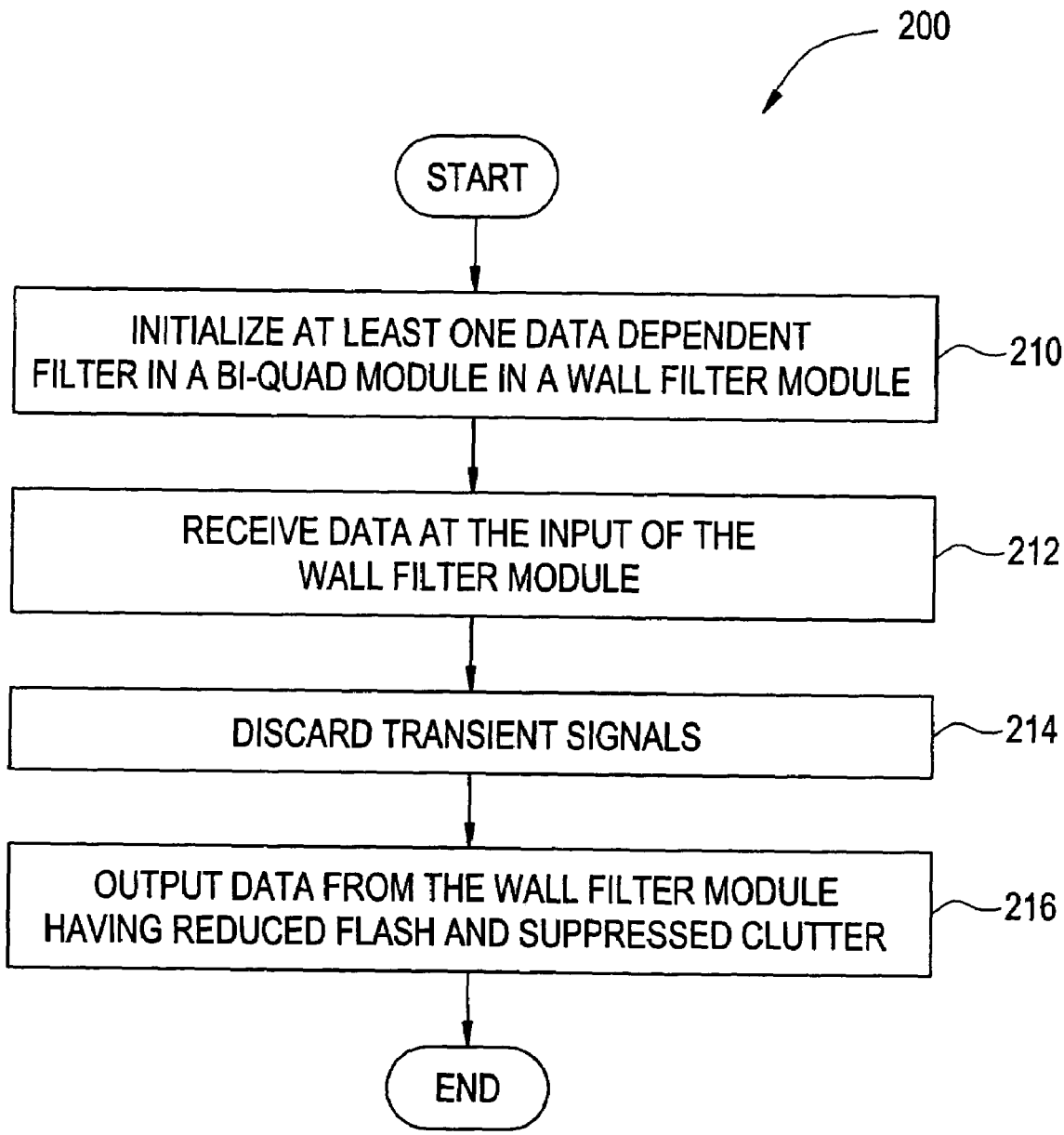

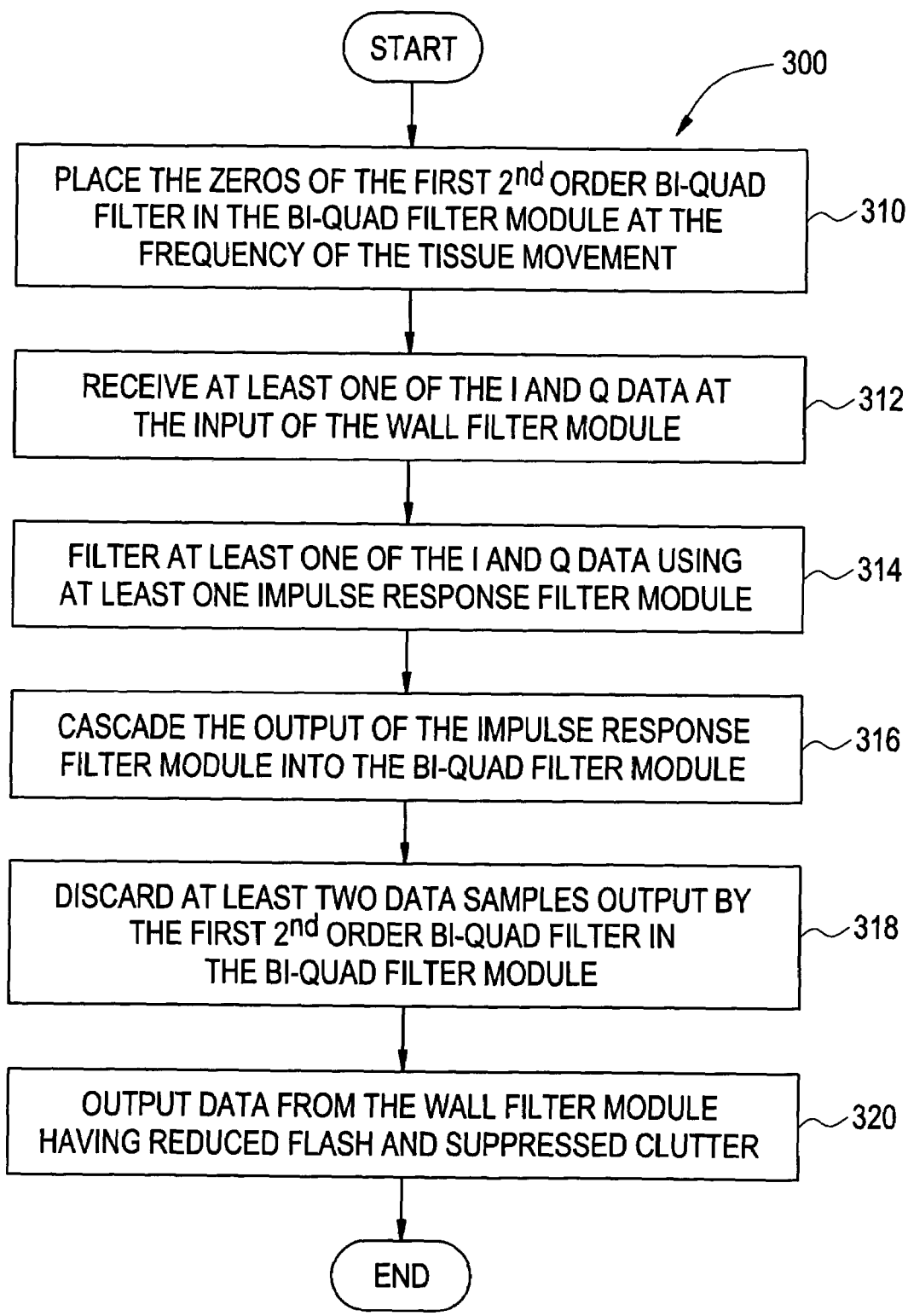

DATA DEPENDENT COLOR WALL FILTERS

RELATED APPLICATIONS

[Not Applicable]

FEDERALLY SPONSORED RESEARCH OR DEVELOPMENT

[Not Applicable]

[MICROFICHE/COPYRIGHT REFERENCE]

[Not Applicable]

BACKGROUND OF THE INVENTION

The present invention generally relates to ultrasound. In particular, the present invention relates to data dependent color wall filters used in imaging devices or systems for performing diagnostic ultrasound imaging.

Known methods of performing diagnostic ultrasound imaging include B- and M-modes (used to image internal, physical structure), Doppler mode, and color flow mode. The color flow mode is primarily used to image flow characteristics, such as flow characteristics in blood vessels for example. Ultrasound color flow mode is typically used to detect the velocity of blood flow toward/away from an ultrasound transducer. Ultrasound color flow mode utilizes similar techniques used in Doppler mode. Whereas the Doppler mode displays velocity versus time for a single selected sample volume, ultrasound color flow mode displays hundreds of adjacent sample volumes simultaneously. The adjacent sample volumes are laid over a B-mode image and color-coded to represent each sample volume's velocity.

Using Doppler mode effects to measure blood flow in the heart and vessels is known. The amplitude of the reflected waves may be employed to produce black and white images of the tissues, while the frequency shift of backscattered waves may be used to measure the velocity of the backscatterer from tissue or blood. The change or shift in backscattered frequency increases when blood flows toward the ultrasound transducer and decreases when blood flows away from the ultrasound transducer. Color flow images may be produced by superimposing a color image of the velocity of the moving material, blood for example, over the black and white anatomical image. The measured velocity of flow at each pixel determines its color.

It is contemplated that the blood may contain at least one of blood, stationary or slow moving materials and moving materials. One limitation associated with taking Doppler effect measurements of reflected ultrasound waves from blood is that the received echo signal typically contains a large component produced by the stationary or slow moving tissues (alternatively referred to as "clutter" and "color flash artifacts" respectively), whereas the blood reflects ultrasound waves very weakly. The stationary tissues in the blood do not produce any frequency shift in the reflected waves. Therefore these components may be easily filtered out (alternatively referred to as "clutter suppression") without affecting the flow measurement. However, the reflections produced by moving tissue due to cardiac or respiratory motion are frequency shifted and may completely overwhelm signals from the slowly flowing blood.

In standard color flow processing, a high pass filter (alternatively referred to as a "wall filter") may be applied to the data before a color flow estimate is made. This filter is adapted to remove signal components produced by tissue surrounding the blood flow of interest. If these signal components are not removed, the resulting velocity estimate may include a combination of the velocities from the blood flow and the surrounding tissue. The backscatter component from tissue is many times greater than that produced by the blood component, so the velocity estimate will most likely be more representative of the tissue, rather than the blood flow. In order to get the flow velocity, the tissue signal must be filtered out.

When a high-flow-velocity area (a blood vessel for example) is imaged in color flow mode, the region of high amplitude centered around the zero frequency represents the presence of some fairly non-moving structure (a blood vessel wall for example), while the region of somewhat less amplitude centered around some relatively high frequency represents the presence of high flow velocity (blood flow for example). Because of the large difference in frequency between the non-moving structure and the fast-moving blood flow, a wall filter may be used to eliminate a portion of the frequency response corresponding to the non-moving wall has been eliminated. After such wall filtering, some scheme for determining the maximum remaining amplitude (i.e., the amplitude of the high-velocity blood flow) may be utilized so that the flow velocity for that particular sample volume may be displayed.

However, a problem may arise in applying wall filtering in low-flow-velocity imaging. Since the frequencies of the non-moving wall and the slow-moving flow are close together, it is difficult to effectively apply a wall filter to eliminate the "wall" response without resulting in a distorted slow-flow response portion (see FIG. 2B).

Known color flow processors assume that the large signal returning from the surrounding tissue is static (i.e., the tissue is not moving). If such assumption is true, the in-phase and quadrature I and Q data may be filtered separately using simple real filters which remove the DC component and the very low frequencies. The cutoff frequency of these high pass filters may be varied for a given application by changing the filter coefficients.

The assumption with respect to static tissue is generally valid for radiology applications, except in the abdomen, where residual respiratory and cardiac motion cause some amount of tissue motion. In addition, the motion of the handheld transducer approximates or looks like tissue motion. Since the velocity of this motion is usually slow compared to the velocity of the blood flow being imaged, the operator may set the wall filter cutoff frequency high enough to filter out the tissue signal component. Filtering in this way, however, may also remove signals from low-velocity blood flow, often the very signals that the operator wants to image.

Some prior art systems use a wall filter that is manually adjusted by the operator to filter out a narrow band of frequencies in the echo signal centered on the carrier frequency where static signals lie. The bandwidth is adjusted so that the reflected signals from the slow moving wall are eliminated without distorting the measurement of blood flow. If the filter bandwidth is set too wide, signals from slowly moving blood may be eliminated. It should be appreciated that this filter setting is static and is applied over the whole image. As a result, the filter may work adequately at some locations in the field of view of the image, but not at other locations.

One processing approach described in U.S. patent application Ser. No. 08/001,998, incorporated herein by reference in its entirety, uses adaptive wall filtering. Such adaptive wall filtering mixes the wall signal down to zero frequency, then removes the wall signal using a real time domain filter, to filter the I data and the Q data. This reduces the amplitude of the wall signal and enables the flow signal to be detected with greater accuracy, and at lower velocities than previous known processes that don't use this approach. The adaptive wall filter automatically adjusts its center frequency and bandwidth as a function of the received echo signal. A complex mixer receives the received echo signal and outputs a modified echo signal which is shifted in frequency by an amount equal and opposite to the mean frequency of the received echo signal. The wall filter receives the modified echo signal and filters out a band of frequencies that are determined by the variance of the received echo signal. By shifting the frequency of the received echo signal by an amount opposite to its measured mean frequency, the signal components therein due to slowly moving tissue are effectively shifted to the center of the filter. By automatically controlling the width of the stop band of the filter in dependence on the measured variance, the signal components produced by slowly moving tissue are filtered out. The filter output is then processed in a conventional manner to produce a color signal indicative of flow velocity.

Known processing approaches comprise separately reducing flash and suppressing clutter as described in commonly assigned U.S. Pat. No. 5,524,629, which is incorporated herein by reference in its entirety. This approach uses a complex rotation of the input data, so that the motion is placed at DC (OHz). This approach assumes a high pass wall filter will filter out the slow motion tissue. It should be appreciated that the wall filters may have very low cutoff frequencies. Therefore, the complex rotations may not insure that the output of the first stage or module of the bi-quad filter is close to zero.

BRIEF SUMMARY OF THE INVENTION

Certain embodiments relate to a color wall filter (used in an ultrasound imaging device for example) that provides flash reduction and clutter suppression. One embodiment of the color wall filter comprises an impulse response filter stage or module (either a finite or infinite impulse response filter) and a bi-quad filter stage or module that is data dependent. It is contemplated that the bi-quad filter stage or module may comprise a series of bi-quad filters, wherein the impulse response filter stage or module is cascaded into at least one bi-quad filter of the series of bi-quad filters. In at least one embodiment, at least one bi-quad filter in the series of bi-quad filters is data dependent, wherein at least one of the bi-quad filters is a $2^{nd}$ order bi-quad filter. Further, at least one of the bi-quad filter module has moveable zeros, wherein at least one of the moveable zeros of the bi-quad filter module may be placed at a frequency of tissue movement.

Yet another embodiment of the present invention relates to a processor, in an ultrasound image device for example, adapted to image moving tissue. The tissue comprise an impulse response first stage or module and a series of bi-quad filters coupled to the impulse response first stage or module. It is further contemplated that at least one bi-quad filter of the series of bi-quad filters is data dependent. In at least one embodiment of the processor, the output of the impulse response first stage or module is cascaded into the series of bi-quad filters, wherein at least one of the series of bi-quad filters comprises a $2^{nd}$ order bi-quad filter. At least one of the series of bi-quad filters has a moveable zero which may be placed at a frequency of the tissue movement.

Further, the impulse response first stage or module comprises at least one of a finite and infinite impulse response filters.

Yet another embodiment relates to a method of imaging moving tissue using an ultrasound imaging system. This embodiment of the method comprises initializing at least one filter in a wall filter module in the ultrasound imaging system, the filter responsive to tissue movement and filtering input data to the wall filter module. This method further comprises discarding at least one transient signal and outputting data having reducing flash and suppressed clutter.

Other embodiments of the method comprise filtering the input data, which may further comprise filtering at least one of I and Q input data. Initializing at least one filter may comprise moving a zero of a first $2^{nd}$ order bi-quad filter in a bi-quad filter module. Discarding at least one transient signal may comprise discarding at least two data samples output from the bi-quad filter module. Further embodiments of the method relate to the wall filter module comprising at least one of response filter and bi-quad filter modules.

BRIEF DESCRIPTION OF SEVERAL VIEWS OF THE DRAWINGS

FIG. 10 depicts a high level flow diagram illustrating a method for imaging moving tissue using a wall filter module (similar to that illustrated in FIG. 6.

FIG. 11 depicts a detailed flow diagram illustrating a method for imaging moving tissue using a wall filter module (similar to that illustrated in FIG. 6.

Figure 1:
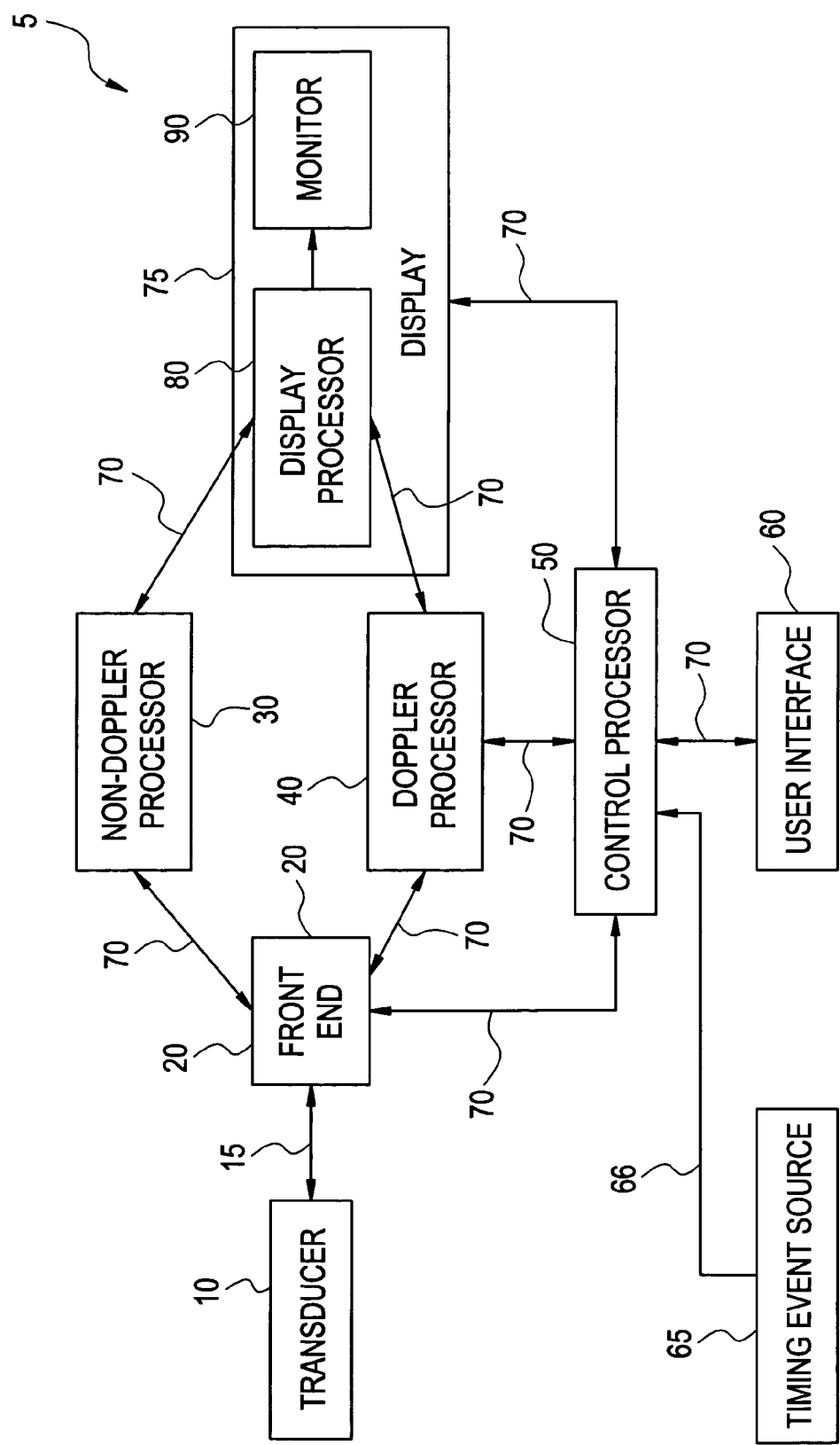
FIG. 1 illustrates a block diagram of an embodiment of an ultrasound machine, device or system made in accordance with various embodiments of the present invention.

The foregoing summary, as well as the following detailed description of certain embodiments of the present invention, will be better understood when read in conjunction with the appended drawings. For the purpose of illustrating the invention, certain embodiments are shown in the drawings.

It should be understood, however, that the present invention is not limited to the arrangements and instrumentality shown in the attached drawings.

DETAILED DESCRIPTION OF THE INVENTION

For the purpose of illustration only, the following detailed description references a certain embodiment of an ultrasound imaging system. It is understood that the present invention may be used with other imaging systems.

FIG. 1 illustrates an embodiment of an ultrasound machine, generally designated 5, in accordance with embodiments of the present invention. A transducer 10 transmits ultrasound waves into a subject by converting electrical analog signals to ultrasonic energy and receives the ultrasound waves backscattered from the subject by converting ultrasonic energy to analog electrical signals.

A front-end 20, that in one embodiment comprises a receiver, transmitter, and beamformer, may be used to create the necessary transmitted waveforms, beam patterns, receiver filtering techniques, and demodulation schemes that are used for the various imaging modes. Front-end 20 performs such functions, converting digital data to analog data and vice versa. Front-end 20 interfaces to transducer 10 using analog interface 15 (although a wireless or other interface is contemplated) and interfaces to a non-Doppler processor 30, a Doppler processor 40 and a control processor 50 over a bus 70 (digital bus for example). Bus 70 may comprise several digital sub-buses, each sub-bus having its own unique configuration and providing digital data interfaces to various parts of the ultrasound machine 5.

Non-Doppler processor 30 is, in one embodiment, adapted to provide amplitude detection functions and data compression functions (used for imaging modes such as B-mode, M-mode, and harmonic imaging for example). Doppler processor 40, in one embodiment provides clutter filtering functions and movement parameter estimation functions used for imaging modes such as tissue velocity imaging (TVI), strain rate imaging (SRI), and color M-mode for example.

In one embodiment, the two processors, 30 and 40, accept digital signal data from the front-end 20, process the digital signal data into estimated parameter values, and pass the estimated parameter values to processor 50 and a display 75 over digital bus 70. The estimated parameter values may be created using the received signals in frequency bands centered at the fundamental, harmonics, or sub-harmonics of the transmitted signals in a manner known to those skilled in the art.

Display 75 is adapted, in one embodiment, to provide scan-conversion functions, color mapping functions, and tissue/flow arbitration functions, performed by a display processor 80 which accepts digital parameter values from processors 30, 40, and 50, processes, maps, and formats the digital data for display, converts the digital display data to analog display signals, and communicate the analog display signals to a monitor 90. Monitor 90 accepts the analog display signals from display processor 80 and displays the resultant image.

A user interface 60 enables user commands to be input by the operator to the ultrasound machine 5 through control processor 50. User interface 60 may comprise a keyboard, mouse, switches, knobs, buttons, track balls, foot pedals, voice control and on-screen menus, among other devices.

A timing event source 65 generates a cardiac timing event signal 66 that represents the cardiac waveform of the subject. The timing event signal 66 is input to ultrasound machine 5 through control processor 50.

In one embodiment, control processor 50 comprises the main, central processor of the ultrasound machine 5, interfacing to various other parts of the ultrasound machine 5 through digital bus 70. Control processor 50 executes the various data algorithms and functions for the various imaging and diagnostic modes. Digital data and commands may be communicated between control processor 50 and other various parts of the ultrasound machine 5. As an alternative, the functions performed by control processor 50 may be performed by multiple processors, or may be integrated into processors 30, 40, or 80, or any combination thereof. As a further alternative, the functions of processors 30, 40, 50, and 80 may be integrated into a single PC backend.

In standard color flow processing, a high pass filter (alternatively referred to as a "wall filter") is applied to the data before a color flow estimate is made. This filter is adapted to remove signal components produced by tissue surrounding the blood flow of interest. If these signal components are not removed, the resulting velocity estimate may include a combination of the velocities from the blood flow and the surrounding tissue. The backscatter component from tissue is many times greater than that produced by the blood component, so that the velocity estimate will most likely be more representative of the tissue, rather than the blood flow. In order to get the flow velocity, the tissue signal must be filtered out.

Figure 2:
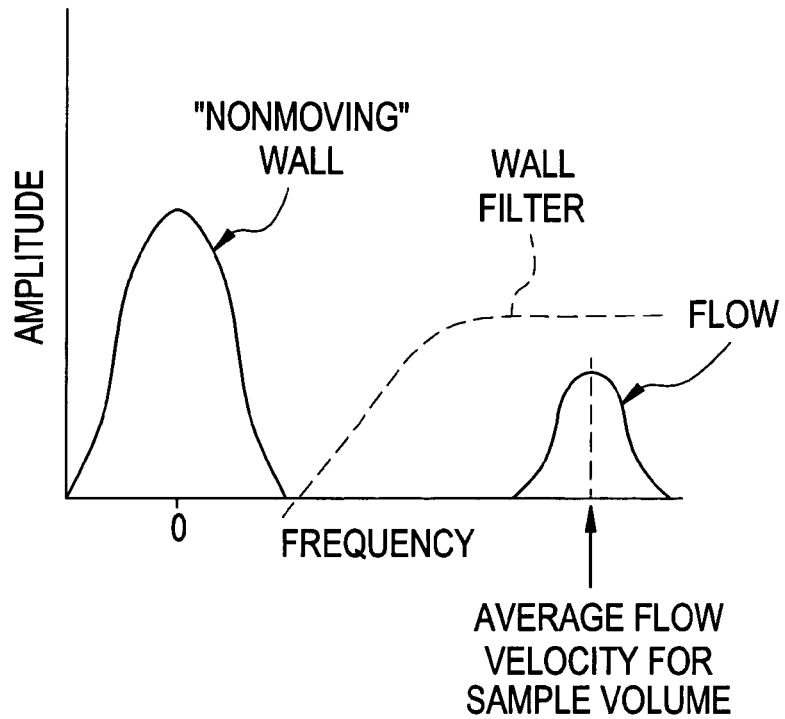
FIG. 2 depicts a graph illustrating a frequency response of a high flow velocity region in the color flow mode, before the application of a wall filter used in a ultrasound machine (similar to that illustrated in FIG. 1 for example).

FIG. 2 depicts a graph illustrating a frequency response of a high flow velocity region in the color flow mode, before the application of a wall filter used in a ultrasound machine (similar to that illustrated in FIG. 1 for example). When a high-flow-velocity area (a blood vessel for example) is imaged in color flow mode, each of the sample volumes has a frequency response similar to that illustrated in FIG. 2. The region of high amplitude centered around the zero frequency represents the presence of some fairly non-moving structure (a blood vessel wall for example), while the region of somewhat less amplitude centered around some relatively high frequency represents the presence of high flow velocity (blood flow for example).

Figure 3:
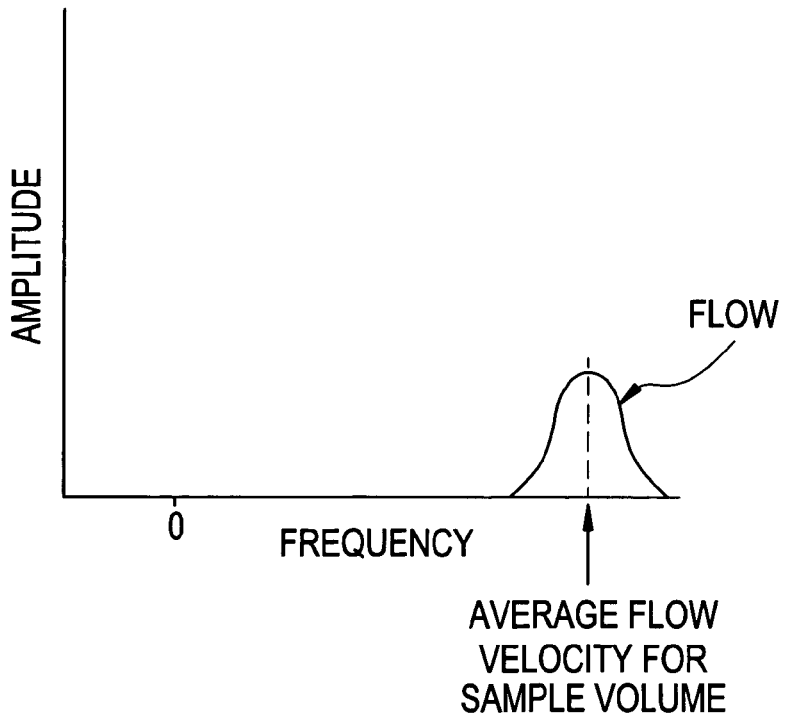
FIG. 3 depicts a graph illustrating a frequency response of a high flow velocity region in the color flow mode after the application of a wall filter used in a ultrasound machine (similar to that illustrated in FIG. 1 for example).

FIG. 3 depicts a graph illustrating a frequency response of a high flow velocity region in the color flow mode after the application of a wall filter used in a ultrasound machine (similar to that illustrated in FIG. 1 for example). Because of the large difference in frequency between the non-moving structure and the fast-moving blood flow, it is known to use a wall filter (illustrated in FIG. 2) to produce the output shown in FIG. 3, where the portion of the frequency response corresponding to the non-moving wall has been eliminated. After applying such wall filter, some methods for determining the maximum remaining amplitude (i.e., the amplitude of the high-velocity blood flow) may be utilized so that the flow velocity for that particular sample volume may be displayed.

Figure 4:
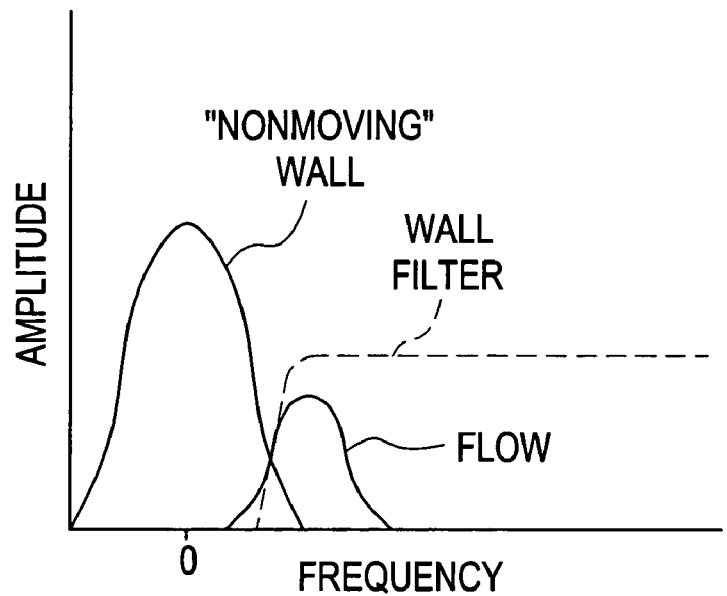
FIG. 4 depicts a graph illustrating a frequency response of a low velocity region in the color flow mode, before the application of a wall filter used in a ultrasound machine (similar to that illustrated in FIG. 1 for example).
Figure 5:
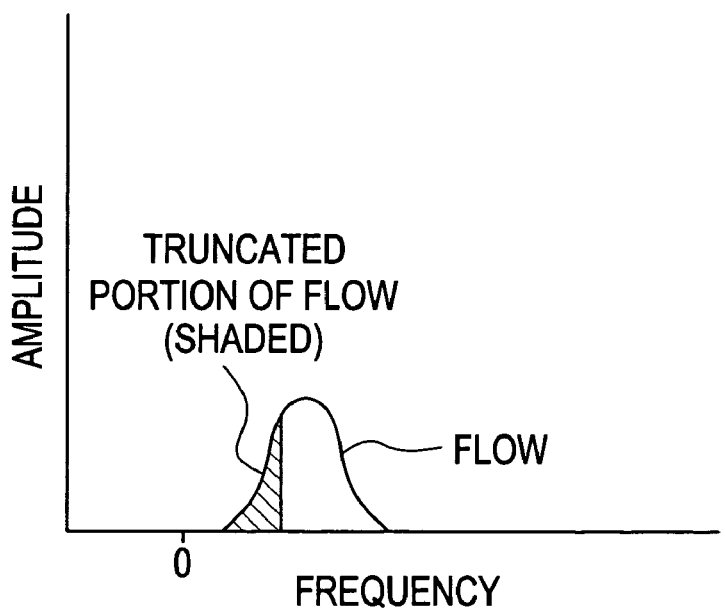
FIG. 5 depicts a graph illustrating a frequency response of a high flow velocity region in the color flow mode, after the application of a wall filter used in a ultrasound machine (similar to that illustrated in FIG. 1 for example).

However, it should be appreciated that problems may arise in applying wall filtering in low-flow-velocity imaging for example. FIG. 4 illustrates a known frequency response for a sample volume in a low-flow-velocity region. Since the frequencies of the non-moving wall and the slow-moving flow are close together, it is difficult to effectively apply a wall filter to eliminate the "wall" response without resulting in a distorted slow-flow response portion as illustrated FIG. 5.

Known color flow processors assume that the large signal returning from the surrounding tissue is static (i.e., the tissue is not moving). If such assumption is true, the in-phase and quadrature data (I data and Q data respectively) may be filtered separately using real filters which remove the DC component and very low frequencies. The cutoff frequency of these high pass filters may be varied for a given application by changing the filter coefficients.

The assumption with respect to static tissue is generally valid for radiology applications, except in the abdomen, where residual respiratory and cardiac motion cause some amount of tissue motion. In addition, the motion of the handheld transducer approximates or looks like tissue motion. Since the velocity of this motion is usually slow compared to the velocity of the blood flow being imaged, the operator may set the wall filter cutoff frequency high enough to filter out the tissue signal component. Cutting off such high frequencies may also remove signals from low-velocity blood flow, which are often the signals that the operator wants to image.

Some prior art systems use a wall filter that may be manually adjusted by the operator to filter out a narrow band of frequencies in the echo signal centered on the carrier frequency where static signals lie. The bandwidth of this filter must be adjusted so that the reflected signals from the slow moving wall are eliminated without distorting the measurement of blood flow. If the filter bandwidth is set too wide, signals from slowly moving blood may be eliminated. It should be appreciated that this filter setting is static and is applied over the whole image. As a result, the filter may work adequately at some locations in the field of view of the image, but not at other locations.

One processing method, described previously, uses adaptive wall filtering. Such known adaptive filtering is performed by mixing the wall signal down to zero frequency and then removing the wall signal using a real time domain filter, to filter the I data and the Q data. This reduces the amplitude of the wall signal and enables the flow signal to be detected with greater accuracy, and at lower velocities than previous processes that don't use this approach.

Such adaptive wall filter automatically adjusts its center frequency and bandwidth as a function of the received echo signal. A complex mixer receives the received echo signal and outputs a modified echo signal which is shifted in frequency by an amount equal and opposite to the mean frequency of the received echo signal. The wall filter receives the modified echo signal and filters out a band of frequencies that are determined by the variance of the received echo signal. By automatically shifting the frequency of the received echo signal by an amount opposite to its measured mean frequency, the signal components therein due to slowly moving tissue are effectively shifted to the center of the filter. By automatically controlling the width of the stop band of the filter in dependence on the measured variance, the signal components produced by slowly moving tissue are filtered out. The filter output is then processed in a conventional manner to produce a color signal indicative of flow velocity.

Yet another processing approach comprises separately reducing flash and suppressing clutter as provided previously. This approach uses a complex rotation of the input data, so that the motion is placed at DC (0Hz). This approach assumes a high pass wall filter will filter out the slow motion tissue. It should be appreciated that the wall filters may have very low cutoff frequencies. Therefore, the complex rotations may not insure that the output of the first stage of the bi-quad filter is close to zero.

One embodiment provides or enables flash reduction and clutter suppression in a single unit. In one embodiment, the wall filter module comprises an impulse response filter stage or module and a bi-quad filter stage module that is data dependent. The filter stage is cascaded into the bi-quad filter stage. One embodiment reduces the transient response while maintaining a sharp cutoff frequency. The transient response cannot be ignored because the color flow uses a packet side or ensemble length of only 6–16 samples.

Without proper filter initialization, the resulting image artifacts may prevent color flow from actively displaying flow velocities. At least one embodiment overcomes this initialization problem, wherein at least one bi-quad filter (the first bi-quad filter for example) of the bi-quad filter stage is adaptive (i.e., data dependent), such that the zeros of the first stage of the filter are placed on the frequency of the tissue movement.

Figure 6:
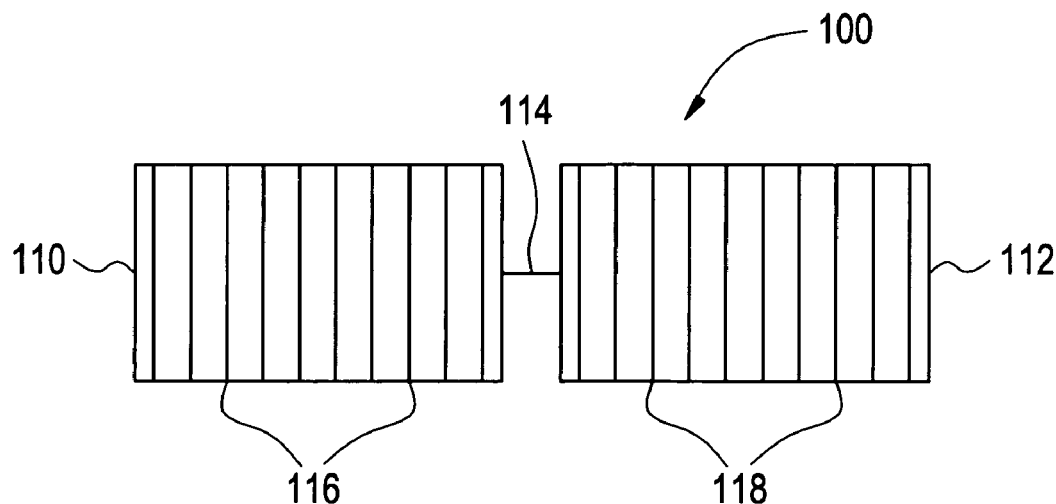
FIG. 6 depicts one embodiment of a wall filter unit or module used in an ultrasound machine or system similar to that depicted in FIG. 1 for example.

One embodiment of a wall filter unit or module, generally designated 100, is illustrated in FIG. 6 contained in an ultrasound machine or system similar to that depicted in FIG. 1 for example. In at least one embodiment, the wall filter unit 100 may be a single unit (contained in processor 40 for example) adapted to reduce flash and clutter suppression. While a single unit in processor 40 is described, other embodiments, including multiple units used in different processors, is contemplated.

In one embodiment, the wall filter unit or module 100 comprises an impulse response filter stage or module 110 and a bi-quad filter stage or module 112. In at least one embodiment, the bi-quad filter module 112 is data dependent. The impulse response filter module 110 may comprise one or more finite impulse response (alternatively referred to as "FIR") or infinite impulse response (alternatively referred to as "IIR") wall filters 116. In at least one embodiment, the output of the filter module 110 is cascaded into the bi-quad filter module 112 using connection 114 for example.

In at least one embodiment, the hi-quad filter module 112 comprises a series of direct form $2^{nd}$ order bi-quad filters 118. In at least one embodiment, the bi-quad filter module 112 reduces the transient response while maintaining a sharp cutoff frequency. The transient response may not be ignored as the color flow uses a packet side or ensemble length of only 6–16 samples. Further, without proper filter initialization, the resulting image artifacts may prevent color flow from actively displaying flow velocities.

It should be appreciated that there are several methods for initializing an IIR filter (similar to the IIR wall filter 116) including, for example, projection, exponential, step and linear initializing. Linear initialization generally provides maximum transient suppression while only requiring minimal computational power. Linear initialization is a special case projection initalization, where the first two samples are used for initialization. However, linear initalization assumes that the first two outputs of the first bi-quad filters 118 are near zero. It should be appreciated that this assumption is not always true. Tissue motion and location of the zeros of the bi-quad filters 118 may cause the output the First bi-quad filter 118 to fail to meet this criteria. Because of this, the wall filter module 100 may not be properly initialized, and artifacts, such as color tones on interfaces or flash due to probe movement, may appear. One embodiment overcomes this initialization problem. In one embodiment, at least one bi-quad filter 118 (the first bi-quad filter 118) of the bi-quad filter module 112 is adaptive (i.e., data dependent). In at least one embodiment, this means that the zeros of the first filter 118 of the bi-quad filter module 112 are placed on the frequency of the tissue movement.

Moving the zeros of the first filter 118 of the bi-quad filter module 112 may assure that the output of the first filter is close to zero. This enables the linear initialization to properly initialize the filter module 112. In addition, at the output of first filter 118, the first two data samples may be discarded or thrown away as these may still contain transient signals. This process reduces the occurrence of the previously mentioned color artifacts.

Figure 7:
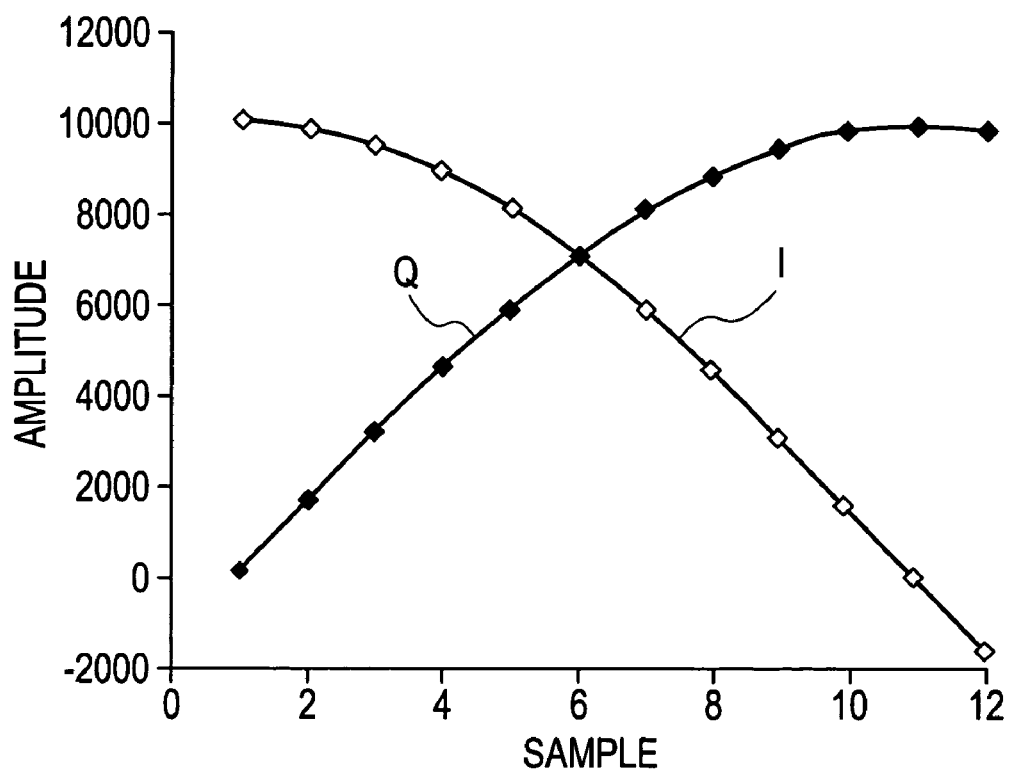
FIG. 7 illustrates a graph depicting I and Q data input into a wall filter in accordance with certain embodiments of the present invention.
Figure 8:
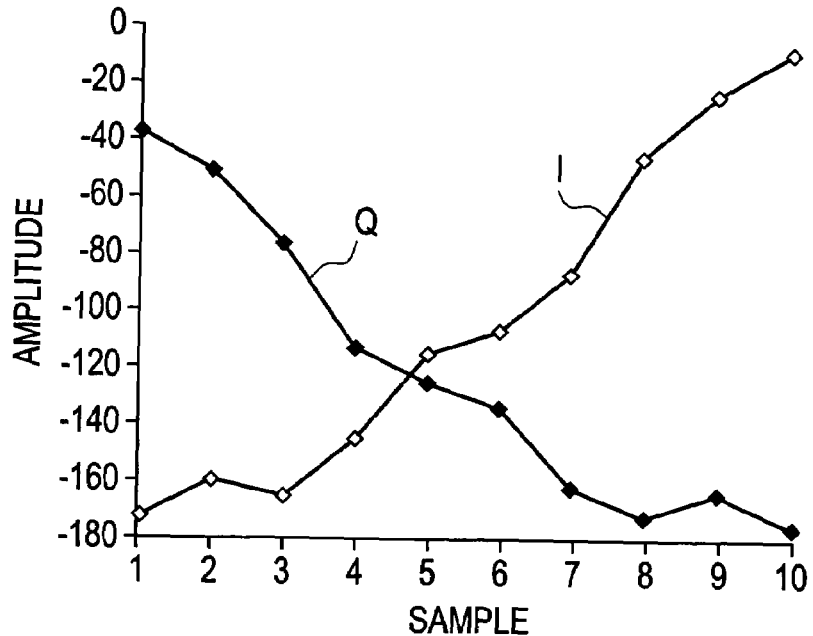
FIG. 8 illustrates a graph depicting I and Q data output of a first stage of a wall filter with no zero movement in accordance with certain embodiments of the present invention.
Figure 9:
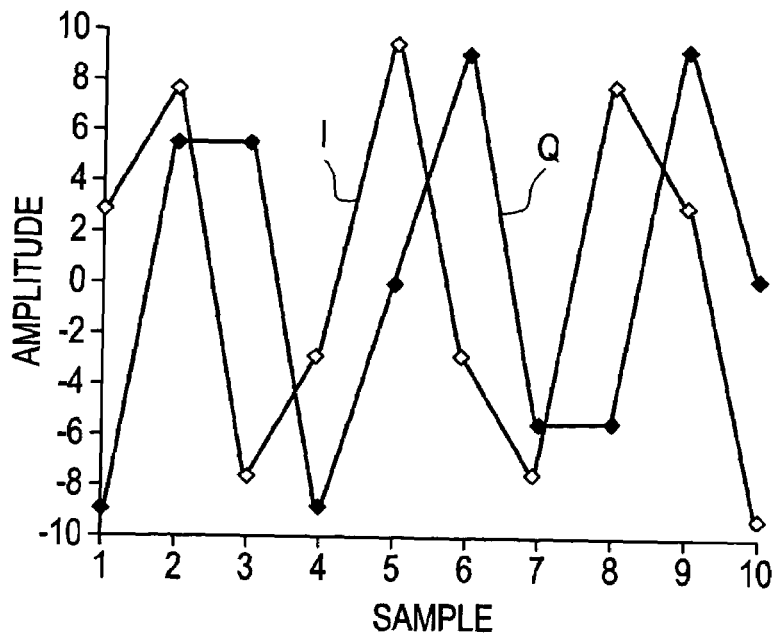
FIG. 9 illustrates a graph depicting I and Q data output of a first stage of a wall filter with zero movement in accordance with certain embodiments of the present invention.

FIGS. 7–9 illustrate one or more benefits of one embodiment of the present invention. FIGS. 7–9 illustrate how wall filter initializations are improved by making the first bi-quad filter of the bi-quad filter stage of the wall filter data dependent. FIG. 7 illustrates I and Q data input into one embodiment of the wall filter. The I and Q data input into the wall filter comprises a combination of slow moving wall signals modeled as a 20,000 unit peak to peak SIN wave of frequency (prf/2) *0.05 plus a flow signal modeled as a 10 units peak to peak SIN wave or frequency (prf/2) *0.6.

FIG. 8 illustrates the output of the first stage of a wall filter with no zero movement. FIG. 8 clearly indicates that the 10 unit peak to peak flow signal is now visible.

FIG. 9 illustrates the output of the first stage of a wall filter with a data dependent zero movement. FIG. 9 clearly illustrates that the flow signal has been properly filtered. FIG. 10 depicts a high level flow diagram illustrating a method, generally designated 200, for imaging moving tissue using a wall filter module (similar to that illustrated in FIG. 5. In at least one embodiment, method 200 comprises block 210, initializing at least one data dependent filter in a bi-quad module in the wall filter module. In at least one embodiment, initializing the data dependent filter comprises placing the zeros of a first $2^{nd}$ order bi-quad filter at the frequency of the tissue.

Method 200 further comprises block 212, receiving data at the input of the wall filter and block 214, discarding at least one transient signal. Block 216 comprises outputting data from the wall filter module having reduced flash and suppressed clutter.

FIG. 11 depicts a detailed flow diagram illustrating a method, generally designated 300, for imaging moving tissue using a wall filter module (similar to that illustrated in FIG. 6. Method 300 comprises block 310, placing at least one zero of a first $2^{nd}$ order bi-quad filter in the bi-quad filter module at the frequency of the tissue movement. Block 312 comprises receiving at least one of I and Q data at the input of the wall filter module.

Method 300 comprises block 314, filtering at least one of the I and Q data using at least one impulse response filter module. Block 316 comprises cascading the output of the impulse response filter module into the bi-quad filter module. Block 318, comprises discarding at least two data samples output by the first $2^{nd}$ order bi-quad filter in the bi-quad filter module. Block 320 comprises outputting data from the wall filter module having reduced flash and suppressed clutter.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A color wall filter system that provides flash reduction and clutter suppression, the system comprising:
   an impulse response filter module, wherein said impulse response filter module includes at least one finite impulse response filter; and
   a bi-quad filter module that is data dependent, wherein said data dependent bi-quad filter module includes a plurality of bi-quad filters, wherein at least one of said plurality of bi-quad filters includes at least one moveable zero, and wherein said at least one moveable zero is placed on a frequency of wall tissue movement,
   wherein said impulse response filter module is cascaded into said bi-quad filter module.

2. A processor for an ultrasound imagine system, said processor comprising:
   a $2^{nd}$ order infinite impulse response (IIR) filter that is data dependent, wherein said data dependent IIR filter includes at least one moveable zero, and wherein said at least one moveable zero is placed on a frequency of wall tissue movement; and
   a finite impulse response (FIR) filter, wherein said FIR filter is cascaded into said data dependent IIR filter.

3. A method of imaging moving tissue using an ultrasound imaging system, said method comprising:
   initializing a color wait filter module in the ultrasound imaging system, wherein said color wall filter module includes a finite impulse response filter cascaded into a data dependent bi-quad filter, wherein said bi-quad filter includes at least one moveable zero, and wherein said at least one moveable zero is placed on a frequency of wall tissue movement;
   filtering input data to said wall filter module;
   discarding at least one transient signal from said input data; and
   outputting data having reduced flash and suppressed clutter.

4. The method of claim 3, wherein filtering said input data comprises filtering at least one of I and Q input data.

5. The method of claim 3, wherein said discarding at least one transient signal from said input data comprises discarding at least two data samples output from said bi-quad filter.

* * * * *